(12) United States Patent
Halbrook

(10) Patent No.: US 6,371,547 B1
(45) Date of Patent: Apr. 16, 2002

(54) SCRATCH PROTECTOR

(76) Inventor: William K. Halbrook, 1005 Countryside Dr., De Pere, WI (US) 54115

(*) Notice: Subject to any disclaimer, the term of this patent is extended or adjusted under 35 U.S.C. 154(b) by 0 days.

(21) Appl. No.: 09/584,504

(22) Filed: May 31, 2000

(51) Int. Cl.[7] .................................................. B60J 7/20
(52) U.S. Cl. ...................................... 296/136; 150/166
(58) Field of Search ......................... 296/136; 150/166; 52/DIG. 14

(56) References Cited

U.S. PATENT DOCUMENTS

| 4,925,234 | A | * | 5/1990 | Park et al. ............... 296/136 |
| 4,953,903 | A | * | 9/1990 | Crane ...................... 296/136 |
| 4,958,881 | A | * | 9/1990 | Piros ....................... 296/136 |
| 5,158,324 | A | * | 10/1992 | Flesher .................... 296/136 |
| 5,161,849 | A | * | 11/1992 | Holland ................... 296/136 |
| 5,176,421 | A | * | 1/1993 | Fasiska .................... 296/136 |
| 5,209,545 | A | | 5/1993 | Slaugh |
| 5,401,074 | A | * | 3/1995 | Timerman ............... 296/136 |
| 5,597,196 | A | * | 1/1997 | Gibbs ...................... 296/136 |
| 5,605,369 | A | * | 2/1997 | Ruiz ........................ 296/136 |
| 5,662,372 | A | * | 9/1997 | Lubkeman ............... 296/136 |
| 5,927,793 | A | | 7/1999 | McGrath, Jr. |
| 5,984,401 | A | * | 11/1999 | Hannah .................... 296/136 |
| 6,056,347 | A | * | 5/2000 | D'Adamo ................ 296/136 |
| 6,070,629 | A | * | 6/2000 | Whitesdie ................ 296/136 |

FOREIGN PATENT DOCUMENTS

JP            03014725       *    1/1991

OTHER PUBLICATIONS

Publication: The Brush Bra, Off the Beaten Path, Inc., Year: 2000, Order Form and Web Site Pages.
Brochure–"Camoclad Camouflage System" with instruction book. Year–2000. Camoclad Camouflage System, Chicago, Illinois.

* cited by examiner

Primary Examiner—Ken Patel
(74) Attorney, Agent, or Firm—Ryan Kromholz & Manion, S.C.

(57) ABSTRACT

A scratch resistor for a vehicle having a front shield and a rear shield. The front shield is carried by a vehicle and covers at least in part a front portion of the vehicle. The rear shield is carried by the vehicle and covers at least in part a rear portion of the vehicle. A method of protecting a vehicle from scratches is also disclosed.

2 Claims, 5 Drawing Sheets

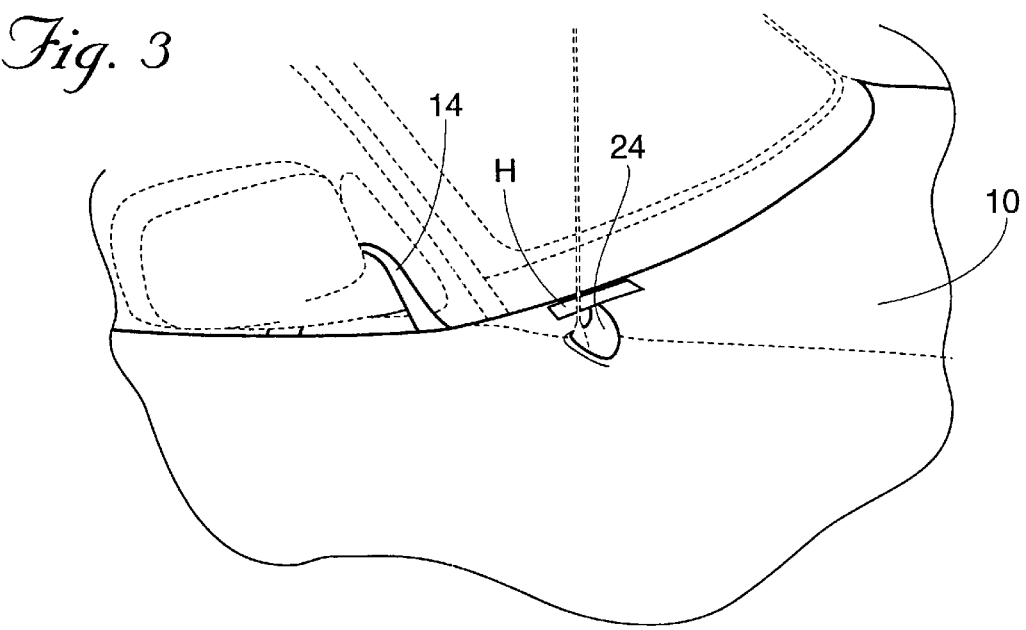
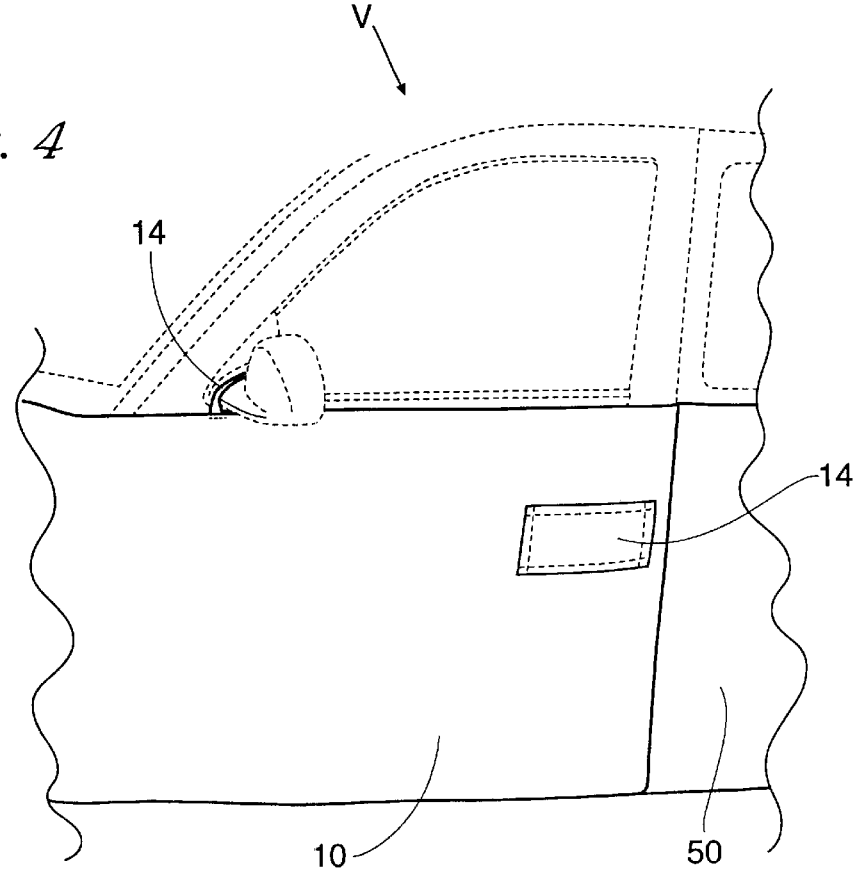

SCRATCH PROTECTOR

FIELD OF INVENTION

This invention relates to vehicle accessories, namely vehicle covers to prevent paint scratching.

BACKGROUND OF THE INVENTION

The present invention relates generally to covers provided on trucks and Sport Utility vehicles ("SUV's"). More particularly, this invention relates to a cover provided about trucks and/or SUVs.

It is often desirable for hunters, farmers, or anyone driving a vehicle in the outdoors, to run their vehicle through woods, brush, farm fields, or other places where the vehicle is exposed to outdoor elements that can scratch the truck's exterior. With the ever-increasing costs of trucks and sport utility vehicles, the owners of the trucks or sport utility vehicles take more care, or should exercise more care, in retaining the value of the vehicle. One factor that could lead to a decrease in truck or SUV value is scratches on the exterior of the truck. These scratches are both unsightly and potentially harmful to the metal exposed when the paint is scratched. For instance, localized areas of rust could develop in and around areas affected by scratches.

On example of a vehicle covering known in the art is a "bra" regularly disposed around the headlights, grill, and front bumpers of cars. The car bra functions to prevent debris from chipping paint while driving, as well as adding aesthetic qualities to the vehicle. Other covers known in the art include recreation vehicle windshield or see the vehicle's rearview mirrors. Most importantly, these covers do not allow safe vehicular travel while at the same time preventing scratches to the vehicle's exterior.

SUMMARY OF THE INVENTION

A scratch resistor comprising a front shield and a rear shield, wherein the front shield is carried by a vehicle, and wherein the front shield covers at least in part a front portion of the vehicle, and wherein the rear shield is carried by the vehicle and covers at least in part a rear portion of the vehicle.

A method of protecting a vehicle from scratches, the method comprising the steps of providing a front shield, coupling the front shield with a front driver side door, draping the front shield about a front portion of a vehicle, coupling the front shield with a front passenger side door, providing a rear shield, coupling the rear shield with the vehicle trailing the front driver side door, draping the rear shield about a rear portion of a vehicle, coupling the rear shield with the vehicle trailing front passenger side door.

DESCRIPTION OF THE DRAWINGS

FIG. 3 is a perspective view with portions cut away of a scratch resistor provided with an antenna hole.

FIG. 4 is a perspective view with portions cut away of a scratch resistor with a loop disposed about a rearview mirror.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
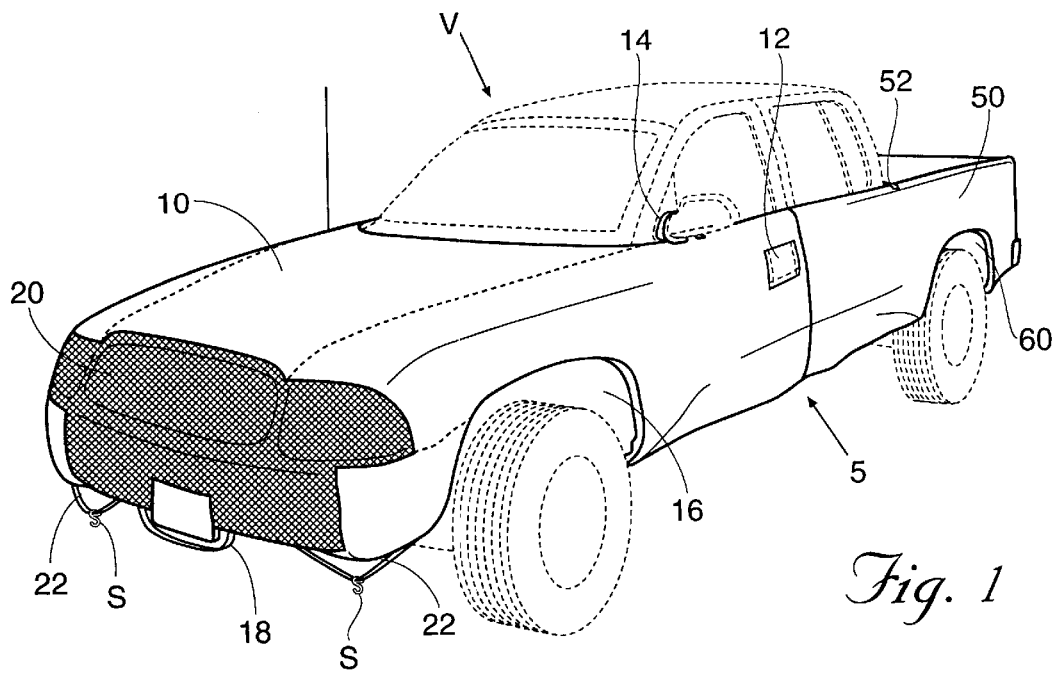
FIG. 1 is a front-side elevated perspective view of a truck with a scratch resistor carried by the truck.

Referring to FIG. 1, a scratch resistor 5 is shown carried by a vehicle V. The scratch resistor 5 comprises a front shield 10 and one or more rear shields 50. Although the rear shield 50 could be constructed of only one piece, it is preferable to provide two rear shields 50 coupled together in order to enable convenient tailgate opening and closing. The scratch resistor 5 is designed to fit snugly around a vehicle V as shown in FIG. 1. The scratch resistor 5 generally covers a front portion of a vehicle and a rear portion of a vehicle. The front shield 10 covers the front portion, the front portion comprising the hood, the front quarter panels, the front doors, the front grill, and headlights. The rear shield 50 covers the rear portion, the rear portion comprising the rear quarter panels, the rear doors, if any, and the tailgate of the vehicle.

Several attachment mechanisms couple the scratch resistor 5 to the vehicle V. These mechanisms are provided to maintain the relative vertical and horizontal position of the scratch resistor 5 on the vehicle both while the vehicle is in motion and while the vehicle is stationary. For this purpose, one or more mirror loops 14 are provided, as well as one or more straps 22, a license plate loop 18, and one or more rear shield suspenders 52. The straps 22 can comprise a material capable of elongation, such as an elasticized fabric or rubber, coupled with an S-hook S. The S-hooks S can be conveniently coupled with any number of voids commonly provided on the vehicle V's underbody or fenders or bumpers. As will be described later, the scratch resistor 5 is also coupled to interior regions of the vehicle V such as door interiors.

The scratch resistor 5 is generally constructed of pieces of light and rugged fabric material stitched together to form the larger front shield 10 and rear shields 50. The materials are generally provided to prevent paint from scratching and therefore should possess the appropriate strength to withstand tearing when exposed to sticks, trees, rocks, brush, and broken glass at ordinary vehicle travel speeds.

Suitable fabric materials can comprise a wide variety of materials and include, for instance, lightweight polyester or rip-stop nylon material, canvas, flexible plastic material, or any other of a wide range of materials. The fabric is generally, where necessary, provided with interlocking seams and reinforcements at stress points and between different pieces of fabric. Additionally, elasticized seams can be provided in order to ease installation of the scratch resistor 5 onto the vehicle V.

Still referring to FIG. 1, an element cover 20 is provided in order to cover the front headlights and the front vehicle grill as shown in FIG. 1. Preferably, this material allows light to emit from under the scratch resistor 5, and also allows air to flow freely into the vehicle's grille. A strong fabric mesh material performs these purposes suitably.

The scratch resistor 5 is configured around all four wheel wells of the vehicle V by providing a front wheel well void 16 on both the passenger and driver sides of the vehicle, and a rear wheel well void 60 on both the passenger and driver sides of the vehicle.

As is also shown on FIG. 1, a door handle access panel 12 is provided both on the passenger's side and the driver's side of the vehicle, in order to provide manual access to the doors' handles.

Figure 2:
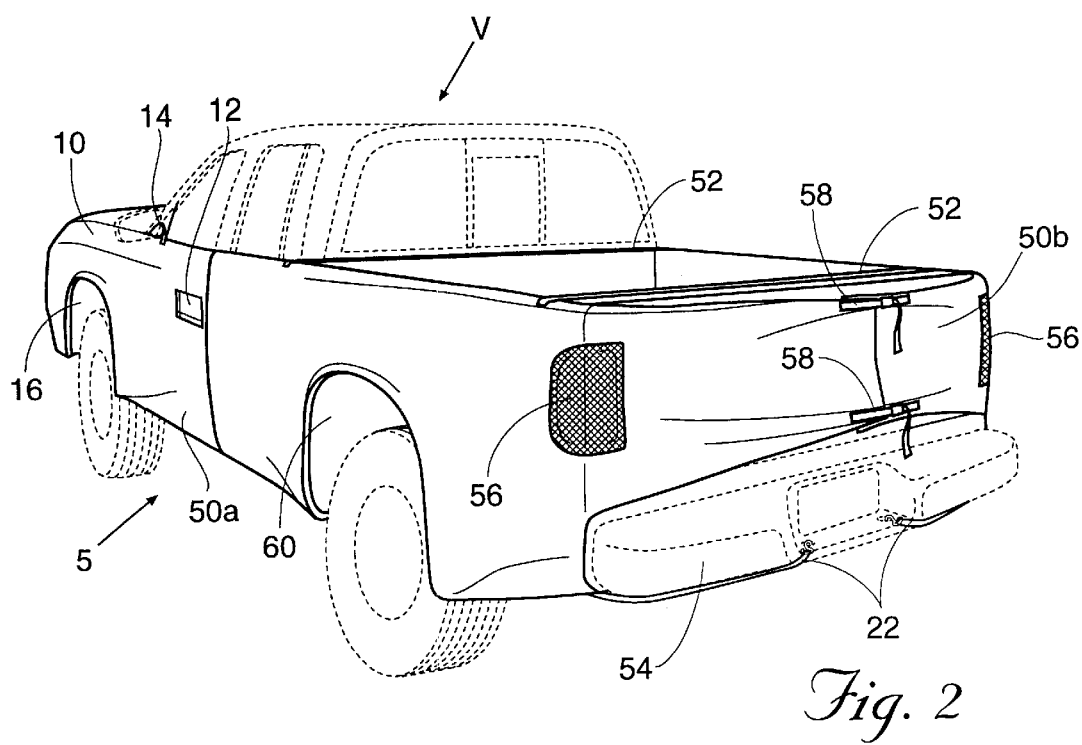
FIG. 2 is a rear-side elevated perspective view of a truck with the truck carrying a scratch resistor.

Referring now to FIG. 2, a rear perspective view of the scratch resistor 5 is shown. Similar to the element cover 20 on the front shield 10, the rear shield 50 is provided with one or more taillight covers 56. Like the element cover 20, the taillight covers 56 are provided to allow lights indicating braking or reverse gear engagement to emit from under the rear shield 50. To serve this purpose, the taillight covers 56 are also preferably constructed of light and air permeable material, such as a strong fabric mesh material.

Still referring to FIG. 2, if, as is preferable, the rear shield 50 is constructed of two pieces 50A and 50B, a shield-to-shield coupling 58 is provided between pieces 50A and 50B. The shield-to-shield coupling 58 can comprise any number of fastening mechanisms such as snap-clips, buttons, or of two strips of nylon, glass fiber or other man-made fiber tape, one covered with hooks and the other covered with loops which adhere together when pressed together ("hook and loop fastening system") such as a VELCRO® hook and loop fastening system. The shield-to-shield coupling 58 can be disengaged when a user would like to drop the tailgate.

Because a vehicle's bumper is typically able to withstand scratching from trees and the like, it is not necessary to shield the bumper. For this reason, it is preferable to provide a rear bumper void 54 to ease fabrication and installation of the scratch resistor 5.

Still referring to FIG. 2, two straps 22 are shown coupled into openings typically provided near a vehicle's rear license plate recess. Rear shield suspenders 52 are provided between the passenger and driver sides of the vehicle to provide vertical support to the scratch resistor 5, and to further couple rear shield pieces 50A and 50B. Similar to the shield-to-shield coupling 58, the rear shield suspenders 52 are of two detachable elements, fastened together by any number of fastening mechanisms such as snap-clips, buttons, or a hook and loop fastening system. For a pick-up truck without a topper, the rear shield suspenders 52 can extend from passenger side to driver side immediately behind the rear window and on top of the tailgate. This arrangement allows the most access to the truck bed. For a pick-up truck with a topper, or for SUV's, the rear shield suspenders 52 can go over the topper or roof of the vehicle.

Referring now to FIG. 3, an antenna void 24 is provided on the front shield 10 so that the front shield 10 can fit around an antenna, typically disposed in front of a vehicle windshield between the windshield and the hood, while still protecting the hood. The antenna void is partially closed by fastening means H that can comprise snap-clips, buttons, or a hook and loop fastening system.

FIG. 3 also shows the mirror loop 14 disposed about the passenger side rear view mirror. The mirror loop 14 is coupled to the front shield 10 by stitching or other means. The mirror loop 14 is preferably constructed of a material capable of elongation, such as an elasticized fabric or rubber.

Referring now to FIG. 4, the door handle access panel 12 is shown in a closed position, and another mirror loop 14 is disposed about the driver side rear view mirror.

Figure 5:
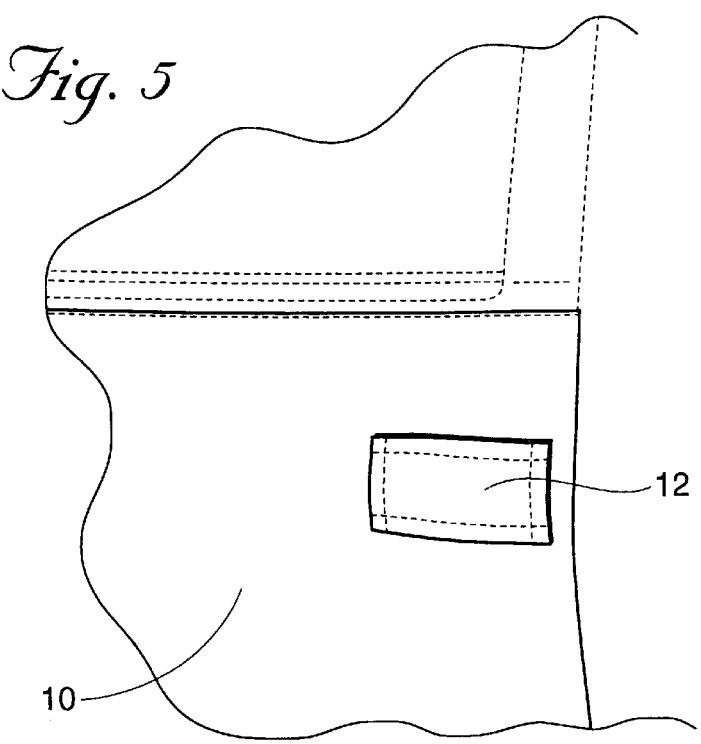
FIG. 5 is a side perspective view with portions broken away of a scratch resistor with a handle flap in a closed position.
Figure 6:
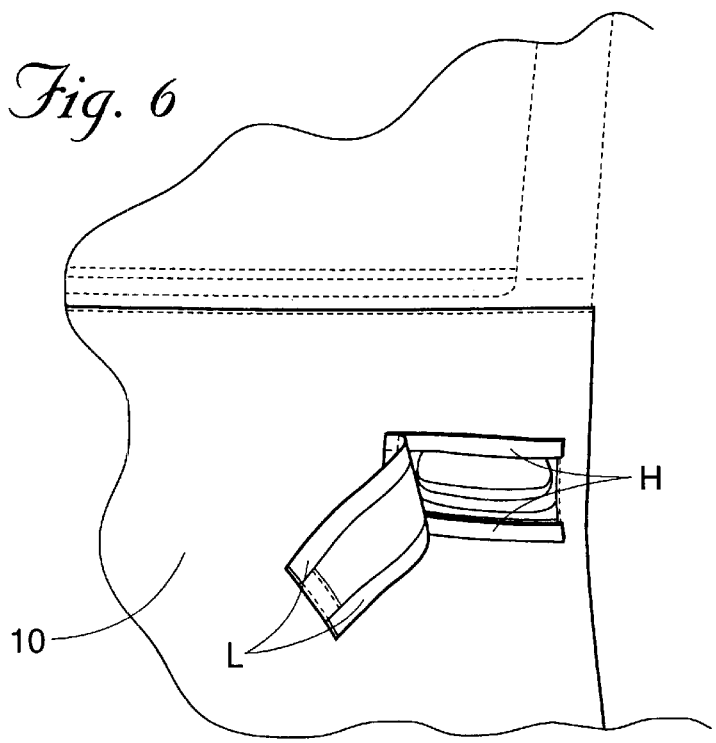
FIG. 6 is a side perspective view with portions broken away of a scratch resistor showing the handle flap in an opened position.

Comparing FIG. 5 and FIG. 6, the door handle access panel 12 is shown in a closed and an open position, respectively. As shown FIG. 6, the door handle access panel is provided with a detachable coupling mechanism that provides access to the door handle when detached. One detachable coupling mechanism that is cost effective, and easy to install and operate is a hook and loop fastening system, with hook strips H and loop strips L disposed on opposing faces of the door handle access panel 12. Of course, the hook strips H and loop strips L could be interchanged where referenced.

Figure 7:
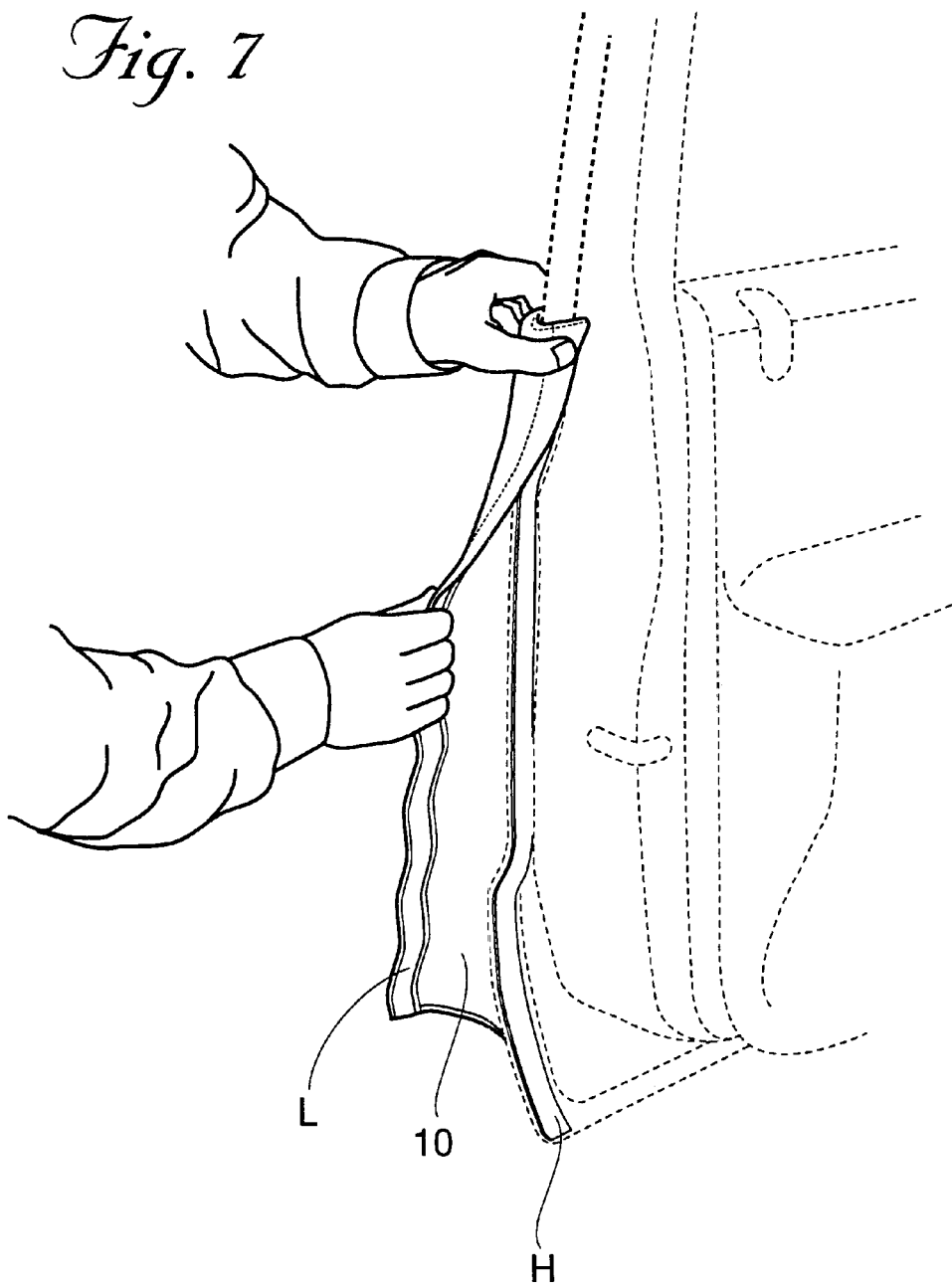
FIG. 7 is a perspective view of a scratch resistor being installed on a vehicle's door and also showing a fastening device disposed behind the driver side door.

Referring now to FIG. 7, a perspective view of a trailing edge of an opened driver side door is shown. The trailing edge is toward the rear of the vehicle V when the vehicle V is in motion. A leading edge of a door is toward the front of the vehicle when the vehicle is in motion. An exterior portion of a door is a surface exposed when the door is shut. An interior portion of a door is any portion of a door that is not exposed when the door is shut.

Hook strip H is disposed on an interior panel of the trailing edge of the front door, and opposing loop strip L is disposed on the front shield 10. The hook strip H is provided with an adhesive that adheres to the trailing edge of the interior door panel itself, exposing the hooks for coupling with the loops. The loop strip L is preferably stitched, but also may be adhesively adhered to the front shield 10 such that when folded about a juncture between the exterior and interior of the door panel, the loop strip L faces the hook strip H. The passenger side front door of the vehicle is similarly equipped.

This configuration advantageously discourages unauthorized removal of the scratch resistor because the vehicle door would have to be opened to remove the scratch resistor. This configuration also advantageously allows a user to enter the vehicle's front doors while the scratch resistor is carried by the vehicle.

The rear shield 50 is also equipped with a loop strip L (not shown) on both the driver and passenger sides of the vehicle V. Similar to the hook strip H disposed on the front doors, hook strips H are disposed on either the leading edge of the rear driver and passenger side doors, or immediately trailing the trailing edge of the front driver and passenger side doors on the leading interior portion of the truck bed or door (not shown).

Figure 8:
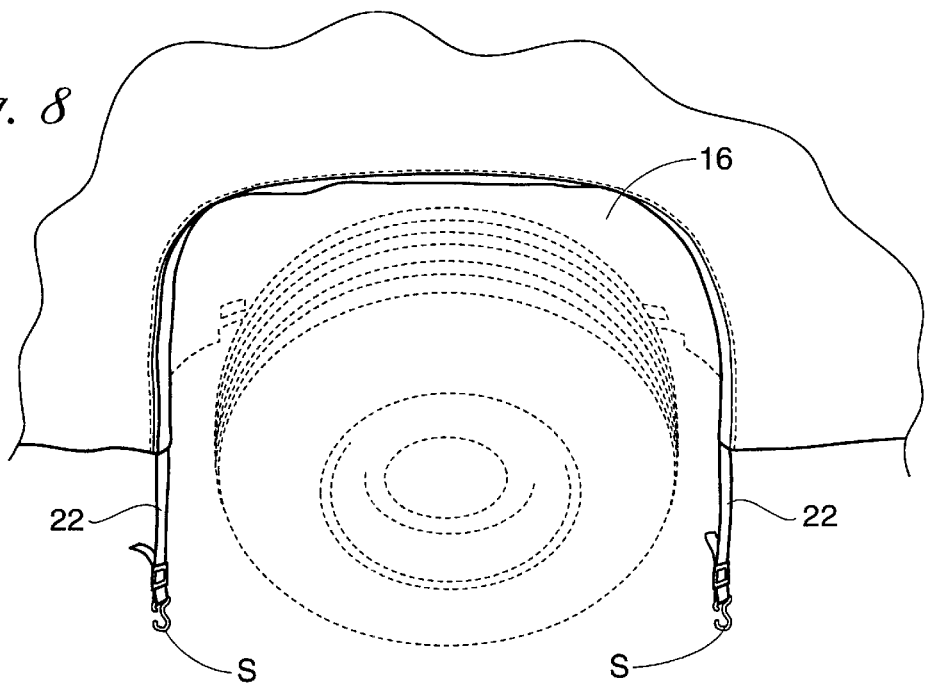
FIG. 8 is a perspective view with portions broken away of a vehicle's wheel well showing a detachable coupling mechanism between a scratch resistor and the underside of the vehicle's body.
Figure 9:
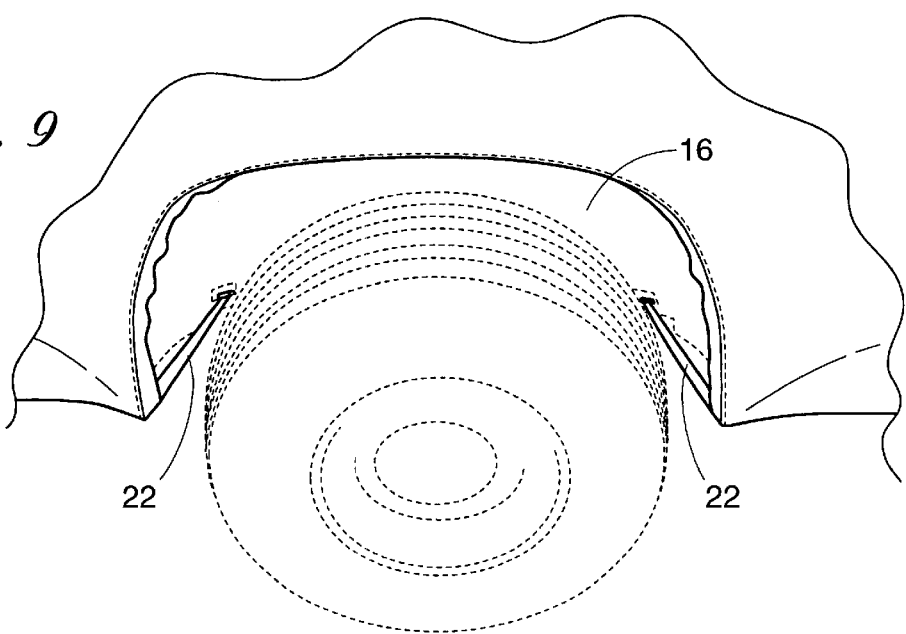
FIG. 9 is a perspective view with portions broken away of a scratch resistor coupled with the underside of the vehicle.

Referring now to FIGS. 8 and 9, the front shield 10 and rear shield 50 are sized to conform in shape to the front and rear wheel wells. Both front wheel well void 16 and rear wheel well void 60 are equipped with straps 22 to fasten to voids in the wheel wells.

To deploy the front shield 10 on the vehicle V, the user first fastens hook strips H to the trailing edge of interior surfaces of the front passenger and driver sides of the vehicle V. Next, the user couples the loop strip L disposed on the driver side of the front shield 10 with the hook strip H disposed on the interior surface of the front driver side of the vehicle V. Next, the user covers the front of the vehicle V with the front shield 10 by draping the front shield 10 about the front portion of the vehicle. Next, the user couples the loop strip L disposed on the passenger side of the front shield 10 with the hook strip H disposed on the interior surface of the front passenger side of the vehicle V. Next, the user applies the mirror loops 14 about the driver side and passenger side rear view mirrors, and places the antenna void 24 about the antenna and fastens the void closed. Next, the user couples straps 22 disposed on the front shield 10 to voids on the vehicle V's underbody, or in the wheel wells, or on the trailing edge of the front bumper. Next, the user applies the license plate loop 18 about the front license plate.

To deploy the rear shield 50 on the vehicle V, the user first fastens hook strips H to the leading edge of interior surfaces trailing the trailing edge of the front passenger and driver side doors on the vehicle V. Next, the user couples the loop strip L disposed on the driver side of the rear shield 50 with the hook strip H disposed on the leading edge of the interior surface trailing the trailing edge of the front driver side door. Next, the user covers the rear of the vehicle V with the rear shield 50 by draping the rear shield 50 about the rear portion of the vehicle. Next, the user couples the loop strip L disposed on the passenger side of the rear shield 50 with the hook strip H disposed on the leading edge of interior surfaces trailing the trailing edge of the front passenger side door on the vehicle V. Next, the user couples the rear shield suspender 52 components so that the rear shield suspender 52 extends from the passenger to the driver side of the vehicle V. Next, the user couples straps 22 disposed on the rear shield 50 to voids on the vehicle V's underbody, or on voids disposed in the wheel wells, or on voids adjacent to the rear license plate holder, or on the leading edge of the rear bumper.

If the rear shield 50 comprises two rear shield pieces 50A and 50B, the user uses the same steps to deploy the rear shield 50, except that the loop strips L on the rear shield pieces 50A and 50B are both applied to the hook strips H, and then the rear shield pieces 50A and 50B are coupled with the shield-to-shield coupling 58.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A body and finish protector for a truck-type vehicle, the vehicle including a front portion and a rear portion including a cargo carrying box with a tailgate, said body finish protector comprising:

a front shield adapted to be mounted on and to protect the front portion of the vehicle;

a rear shield, said rear shield comprising a first rear shield piece and adapted to cover a first side of the rear of said vehicle and a second rear shield piece adapted to cover the side of said vehicle opposite said first side, said first and second rear shield pieces together being adapted to cover said vehicle tailgate, said cargo compartment being uncovered, and wherein the first rear shield piece detachably couples with the second rear shield piece to enable opening of said tailgate without removal of the shield from the vehicle; and, at least one suspender adapted to fit over said cargo compartment from said first side to said opposite side and to be attached to and support said first and second rear shield pieces on the rear of said vehicle.

2. A body and finish protector according to claim 1, the body and finish protector further comprising:

a plurality of straps coupled with the front shield;

a plurality of straps coupled with the rear shield;

said plurality of straps further comprising an elasticized material and the plurality of straps further include a corresponding s-hook;

wherein the s-hooks are selectively coupled with voids on the vehicle.

* * * * *